US012249440B2

(12) United States Patent
Goebel et al.

(10) Patent No.: US 12,249,440 B2
(45) **Date of Patent: *Mar. 11, 2025**

(54) GUARDED COAXIAL CABLE ASSEMBLY

(71) Applicant: HOLLAND ELECTRONICS, LLC, Ventura, CA (US)

(72) Inventors: George Goebel, Camarillo, CA (US); Reed Gibson, Ventura, CA (US); Scott Hatton, Oxnard, CA (US)

(73) Assignee: Holland Electronics, LLC, Ventura, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,644

(22) Filed: Jul. 6, 2023

(65) Prior Publication Data

US 2024/0233986 A1 Jul. 11, 2024

Related U.S. Application Data

(63) Continuation-in-part of application No. 17/231,576, filed on Apr. 15, 2021, now Pat. No. 11,721,453, (Continued)

(51) Int. Cl.

| | |
|---|---|
| ***H01B 11/18*** | (2006.01) |
| ***H01B 7/08*** | (2006.01) |
| ***H01B 7/18*** | (2006.01) |
| ***H01B 7/22*** | (2006.01) |
| ***H01B 13/016*** | (2006.01) |

(Continued)

(52) U.S. Cl.

CPC ....... *H01B 11/1895* (2013.01); *H01B 7/0823* (2013.01); *H01B 7/0869* (2013.01); *H01B 7/18* (2013.01); *H01B 13/016* (2013.01); *H01R 24/54* (2013.01); *H01R 43/28* (2013.01); *H01B 7/225* (2013.01); *H01R 2103/00* (2013.01)

(58) Field of Classification Search

None

See application file for complete search history.

(56) References Cited

U.S. PATENT DOCUMENTS

| | | | | |
|---|---|---|---|---|
| 2,950,338 A * | 8/1960 | Taylor | H01B 7/221 | 174/40 R |
| 3,502,791 A * | 3/1970 | Dahlstrom | H01B 7/188 | 174/115 |

(Continued)

FOREIGN PATENT DOCUMENTS

| | | |
|---|---|---|
| CN | 204632368 U | 9/2015 |
| CN | 105047271 A | 11/2015 |

(Continued)

OTHER PUBLICATIONS

DE10337508_Original_Translation (Year: 2004).*

*Primary Examiner* — Binh B Tran
*Assistant Examiner* — Muhammed Azam
(74) *Attorney, Agent, or Firm* — Paul D. Chancellor; Ocean Law

(57) ABSTRACT

A guarded coaxial cable assembly include one or more conductors, one or more rails, and an outer jacket, the orientation of the rail and the conductor(s) within the outer jacket operative to limit conductor or conductor jacket deformations such as deformations due to bends and transverse loads when the cable assembly is squeezed between a sash and a jamb.

20 Claims, 11 Drawing Sheets

Related U.S. Application Data which is a continuation of application No. 16/799,752, filed on Feb. 24, 2020, now Pat. No. 10,984,924, which is a continuation of application No. 15/796,092, filed on Oct. 27, 2017, now Pat. No. 10,573,433, which is a continuation-in-part of application No. 15/249,446, filed on Aug. 28, 2016, now Pat. No. 10,438,727, which is a continuation of application No. 14/269,105, filed on May 3, 2014, now Pat. No. 9,431,151, which is a continuation of application No. 13/668,260, filed on Nov. 3, 2012, now Pat. No. 8,772,640, which is a continuation of application No. 12/634,293, filed on Dec. 9, 2009, now Pat. No. 8,308,505.

(51) Int. Cl.
*H01R 24/54* (2011.01)
*H01R 43/28* (2006.01)
*H01R 103/00* (2006.01)

(56) References Cited

U.S. PATENT DOCUMENTS 3,549,788 A 12/1970 Apen
3,621,118 A 11/1971 Bunish et al.
3,828,120 A 8/1974 Hansen
3,879,518 A * 4/1975 Ney ........................ H01B 3/24 264/171.16
4,002,820 A 1/1977 Panari et al.
4,131,332 A 12/1978 Hogendobler et al.
4,196,307 A * 4/1980 Moore .................. H01B 7/045 57/221
4,313,029 A 1/1982 Bunish
4,340,269 A 7/1982 McGeary
4,382,653 A 5/1983 Blanchard
4,404,425 A * 9/1983 Rich .................... H01B 7/0823 174/117 A
4,419,538 A * 12/1983 Hansell, III ........... H01B 7/182 174/115
4,492,815 A 1/1985 Maros
4,638,117 A 1/1987 Ney
4,644,099 A * 2/1987 Basconi ............... H01B 7/0823 174/115
4,664,464 A 5/1987 Hutter et al.
4,672,342 A 6/1987 Gartzke
4,740,658 A 4/1988 Hoffman et al.
4,773,879 A 9/1988 Pauza
4,781,433 A 11/1988 Arroyo
4,801,764 A * 1/1989 Ohlhaber ................. H01B 7/08 174/117 F
4,983,794 A 1/1991 Kokubu
5,002,152 A 3/1991 Lebow
5,179,251 A * 1/1993 Mullin ................. G02B 6/4426 174/23 C
5,225,966 A 7/1993 Basavanhally
5,354,954 A 10/1994 Peterson
5,516,986 A 5/1996 Peterson
5,649,043 A 7/1997 Adams
6,005,232 A 12/1999 Janvrin
6,281,443 B1 * 8/2001 Idler .................... H01B 7/0807 174/115
6,372,991 B1 4/2002 Myers
6,384,337 B1 * 5/2002 Drum ................. H01B 11/1813 174/102 R
6,417,455 B1 * 7/2002 Zein ..................... H01B 7/0869 174/117 F
6,464,516 B2 10/2002 Baldock
6,542,674 B1 * 4/2003 Gimblet ............... G02B 6/4433 385/113
6,756,538 B1 6/2004 Murga-Gonzalez et al.
6,844,500 B2 * 1/2005 Williams ............. H01B 7/0823 174/117 F
6,864,426 B2 3/2005 Miyazaki
7,217,884 B2 5/2007 Sezton et al.
7,272,282 B1 9/2007 Seddon et al.
7,314,998 B2 * 1/2008 Amato ............... H01B 11/1895 174/84 R
7,358,443 B2 4/2008 Shatkin et al.
8,308,505 B2 * 11/2012 Hatton ................... H01R 43/28 439/502
8,598,461 B2 12/2013 Lind
8,692,116 B2 * 4/2014 Holland ............. H01B 11/1895 174/117 F
8,727,800 B2 5/2014 Holland
8,772,640 B2 * 7/2014 Hatton ................... H01R 43/28 174/117 F
9,053,837 B2 * 6/2015 Holland ............... H01B 7/0869
9,240,263 B2 1/2016 Kim
9,431,151 B2 * 8/2016 Hatton ................. H01B 7/0869
9,529,170 B2 12/2016 Sutehall
9,595,370 B2 3/2017 Sarchi
10,438,727 B2 * 10/2019 Hatton ................. H01B 7/0823
10,573,433 B2 * 2/2020 Goebel ................ H01B 13/016
10,984,924 B2 * 4/2021 Goebel ..................... H01B 7/18
11,721,453 B2 * 8/2023 Goebel .................. H01R 24/54 439/502
11,810,690 B2 * 11/2023 Hatton ................... H01R 43/28
2002/0053460 A1 5/2002 Takeda
2003/0012529 A1 * 1/2003 Kobayashi ........... G02B 6/4429 385/103
2003/0059181 A1 * 3/2003 Jackman ................ H01B 11/22 385/113
2003/0141100 A1 7/2003 Tanaka
2004/0096168 A1 5/2004 Wells
2004/0154816 A1 8/2004 Rainbolt
2004/0154826 A1 8/2004 Tanaka
2004/0168820 A1 9/2004 Kanamori
2004/0206543 A1 10/2004 Chuo et al.
2004/0258385 A1 12/2004 Kadmoska
2005/0077074 A1 4/2005 Tanaka
2005/0092516 A1 * 5/2005 Chuo ....................... H01B 7/04 174/117 F
2005/0199415 A1 9/2005 Glew
2006/0185878 A1 8/2006 Soffer
2006/0237217 A1 10/2006 Glew
2007/0062721 A1 3/2007 Shatkin et al.
2007/0155231 A1 7/2007 Tang
2008/0169374 A1 7/2008 Kaplan
2008/0185167 A1 8/2008 Lee
2008/0185168 A1 8/2008 Matsukawa
2008/0253723 A1 10/2008 Stokes
2008/0257440 A1 10/2008 Ikeda
2008/0273845 A1 11/2008 Weimann
2009/0034918 A1 2/2009 Caldwell
2009/0034919 A1 2/2009 Caldwell
2009/0041411 A1 * 2/2009 Melton ................ G02B 6/3894 385/80
2009/0166082 A1 7/2009 Liu
2010/0072657 A1 3/2010 Lind
2010/0181438 A1 7/2010 Chauzu
2010/0215328 A1 8/2010 Tatat
2011/0021069 A1 1/2011 Hu et al.
2011/0070769 A1 3/2011 Lin
2011/0136375 A1 6/2011 Hatton
2011/0171853 A1 7/2011 Holland
2012/0048591 A1 3/2012 Gareis
2014/0187080 A1 7/2014 Holland
2015/0132992 A1 5/2015 Holland
2015/0310964 A1 10/2015 Larson
2018/0075950 A1 3/2018 Goebel
2020/0290212 A1 9/2020 Fujioka
2024/0233986 A1 * 7/2024 Goebel .............. H01B 11/1895

FOREIGN PATENT DOCUMENTS

CN 105761795 A 7/2016
CN 205542057 U 8/2016
CN 106057290 A 10/2016
DE 2646373 A1 4/1978
DE 10337508 B3 12/2004

(56) References Cited

FOREIGN PATENT DOCUMENTS

| | | | |
|---|---|---|---|
| EP | 0066910 | A1 | 5/1982 |
| EP | 1253684 | A2 | 10/2002 |
| EP | 2270820 | A2 | 1/2011 |
| FR | 2657993 | A1 | 2/1990 |
| GB | 881287 | A | 11/1961 |
| JP | 2014216109 | A | 11/2014 |
| JP | 2015109750 | A | 6/2015 |
| KR | 20120118871 | A | 10/2012 |
| KR | 101585900 | B1 | 1/2016 |
| WO | 2012030365 | A1 | 3/2012 |
| WO | 2015015674 | A1 | 2/2015 |
| WO | 2018191123 | A1 | 10/2018 |

* cited by examiner

GUARDED COAXIAL CABLE ASSEMBLY

PRIORITY CLAIM AND INCORPORATION BY REFERENCE

This application is a continuation of U.S. patent application Ser. No. 17/231,576 filed Apr. 15, 2021 which is a continuation of U.S. patent application Ser. No. 16/799,752 filed Feb. 24, 2020 now U.S. Pat. No. 10,984,924, which is a continuation of U.S. patent application Ser. No. 15/796,092 filed Oct. 27, 2017, now U.S. Pat. No. 10,573,433, which claims priority to non-provisional of 62/483,435 filed Apr. 9, 2017. U.S. patent application Ser. No. 15/796,092 is a continuation-in-part of Ser. No. 15/249,446 filed Aug. 28, 2016, now U.S. Pat. No. 10,438,727, which is a continuation of U.S. patent application Ser. No. 14/269,105 filed May 3, 2014, now U.S. Pat. No. 9,431,151, which is a continuation of U.S. patent application Ser. No. 13/668,260 filed Nov. 3, 2012, now U.S. Pat. No. 8,772,640, which is a continuation of U.S. patent application Ser. No. 12/634,293 filed Dec. 9, 2009, now U.S. Pat. No. 8,308,505, all of which are by this reference incorporated herein in their entireties and for all purposes.

BACKGROUND OF THE INVENTION

Field of the Invention

The present invention relates to an article of manufacture for conducting electrical signals. In particular, a guarded coaxial cable is provided for conducting signals.

Discussion of the Related Art

Coaxial cables typically used for television including satellite, cable TV and antenna cables are typically 7 mm in diameter, a size large enough to limit signal loss over the distances traveled from an outside location to a location inside a home or building. Typically these cables originate outside a home or apartment such as a multiple dwelling unit (MDU) and terminate inside where TV, wireless, data reception, or satellite reception equipment is located.

A cable normally enters a building through a hole drilled in a wall. But, drilling a hole in a wall and routing a cable through the hole makes a permanent alteration to the building. Since MDU occupants typically do not own the premises, this simple action raises issues including unauthorized building modifications, ownership of the cable modifications, liability for changes and liability for related safety issues.

Wireless solutions do not solve this problem. While capacitive coupling solves the problem of transporting high frequency signals across a glass boundary, such wireless solutions are unable to transport mid and low frequency signals. And, transporting very high frequency signals, for example gigahertz signals such as 28 gigahertz signals, through wall & double glass structures presents problems. In particular, network signals, cable and satellite television signals, electric powering of outdoor devices, and low frequency control signals must be transported using electrical conductors such as twisted pair and coaxial cables.

A solution using the space between the windows or doors and their frame is well known. Here, cables are passed through an existing opening without modification to the building structure. But, using such openings to pass a typical 6 to 7 mm O.D. cable presents challenges including closing the window or door when it is blocked by the cable and maintaining a fully functional cable when it is deformed by impact and compression from operation of the window or door.

The gap between a window/door and its frame is typically less than the 6 to 7 mm size of the cable. In many windows and doors, the space provided for soft weather sealing material and/or the latching tolerance of the door/frame interface provides a gap on the order of about 3 mm. Therefore, a 6 to 7 mm cable in this application will likely be squeezed and damaged while a cable of 3 mm or smaller diameter will likely avoid damage.

Coaxial cable deformations are undesirable because they damage cable covering and abruptly change the coaxial cable conductor spacing. The same is true of twisted pair cabling. For example, with coaxial cable conductor spacing changes tend to change the characteristic impedance of the cable and reflect radio frequency power back toward the source, causing a condition called standing waves. The abrupt change in impedance acts as a signal bottleneck and may result in detrimental data delays and signal lock-ups found in satellite TV signal transmission systems.

Twisted pair and coaxial cable entry solutions face a variety of problems including one or more of: 1) traveling through a small space between the closed window/door and its frame; 2) destruction or degradation from impacts when windows or doors are operated; 3) functioning within its specifications, for example a DBS Satellite coaxial cable must maintain a minimum impedance matching of the RF signal (12 dB minimum return loss at 2150 MHz) in order for the home device to operate correctly; and 4) passing electric current such as a DC current to power an outside device and low frequency control signals when needed.

The present methods of solving these problems lie in the construction of an extension cable that can pass through the small space and have coaxial connectors at each end to re-fasten the larger 7 mm coaxial long distance transmission cable at each end. These methods include using cables with diameters in the range of 3-4 mm, using armor such as metallic armor and other armoring methods known to persons of ordinary skill in the art, and using flattened cable or coaxial cable to provide a thin profile.

None of these methods provides a robust solution. The first method often fails to protect the cable since cables over 3 mm in diameter are larger than the typical available window/door to frame gaps. When the door or window is closed, these cables are deformed to varying degrees rendering them useless or degrading their performance. In addition, the outer covering on such cables is soft and easily breached by repeated operation of windows/doors.

The second method not only uses cables larger than 3 mm, it also prevents the cable from making sharp turns such as 90 degree bends typical of the window and door frame applications. Here, the minimum bending radius of the extender cable is unacceptably increased by the armor.

The third method using a flat/non-circular coaxial cable provides inferior performance even before it is installed. In addition, bending the flat twisted pair or coaxial cable in one or more sharp bends of window/door frames further distorts the cable cross-section and impairs signal transmission. Further, this solution requires a soft sheath for bends that can easily be breached by repetitive impacts from operation of windows/doors.

What is needed for various applications is a guarded cable utilizing untwisted or twisted conductors or a coaxial cable assembly. For example a cable assembly including a coaxial cable having features including one or more of the following: 1) a cable assembly providing good RF performance including meeting industry standards such as 10 dB return loss, for a 75 ohm impedance, at a highest frequency of about 2150 MHz; 2) the cable assembly safely passing DC currents up to about 1.5 amperes with acceptable and/or minimal loss; 3) the cable assembly able to make multiple 90 degree bends to fit into the door frame; and, 4) the cable assembly performing within its specifications despite repeated impacts from windows/doors.

While known solutions are widely employed and the networking and cable and satellite television industries show little interest in developing new solutions, the present invention offers significant advancements over what has been done before.

SUMMARY OF THE INVENTION

In the present invention, a guarded cable assembly includes untwisted or twisted conductors or a micro-coaxial cable and an adjacent rail or bumper member where at least a portion of the assembly can be deformed to assume and substantially maintain a plurality of different shapes. Twisted and untwisted conductors may provide maintenance of digital data rate and/or DC power for example POE (power over Ethernet).

In various embodiments the invention provides for one or more of an improved method of transporting signals such as RF signals, DC current, and low frequency control signals via a guarded coaxial cable assembly and transporting the same through a confined space such as the gap between doors/windows and an abutting frame member.

BRIEF DESCRIPTION OF THE DRAWINGS

The present invention is described with reference to the accompanying figures. These figures, incorporated herein and forming part of the specification, illustrate the invention and, together with the description, further serve to explain its principles enabling a person skilled in the relevant art to make and use the invention.

DETAILED DESCRIPTION OF THE PREFERRED EMBODIMENTS

The disclosure provided in the following pages describes examples of some embodiments of the invention. The designs, figures, and description are non-limiting examples of embodiments they disclose. For example, other embodiments of the disclosed device and/or method may or may not include the features described herein. Moreover, disclosed advantages and benefits may apply to only certain embodiments of the invention and should not be used to limit the disclosed invention.

To the extent parts, components and functions of the described invention exchange electric power or signals, the associated interconnections and couplings may be direct or indirect unless explicitly described as being limited to one or the other. Notably, parts that are connected or coupled may be indirectly connected and may have interposed devices including devices known to persons of ordinary skill in the art.

Figure 1:
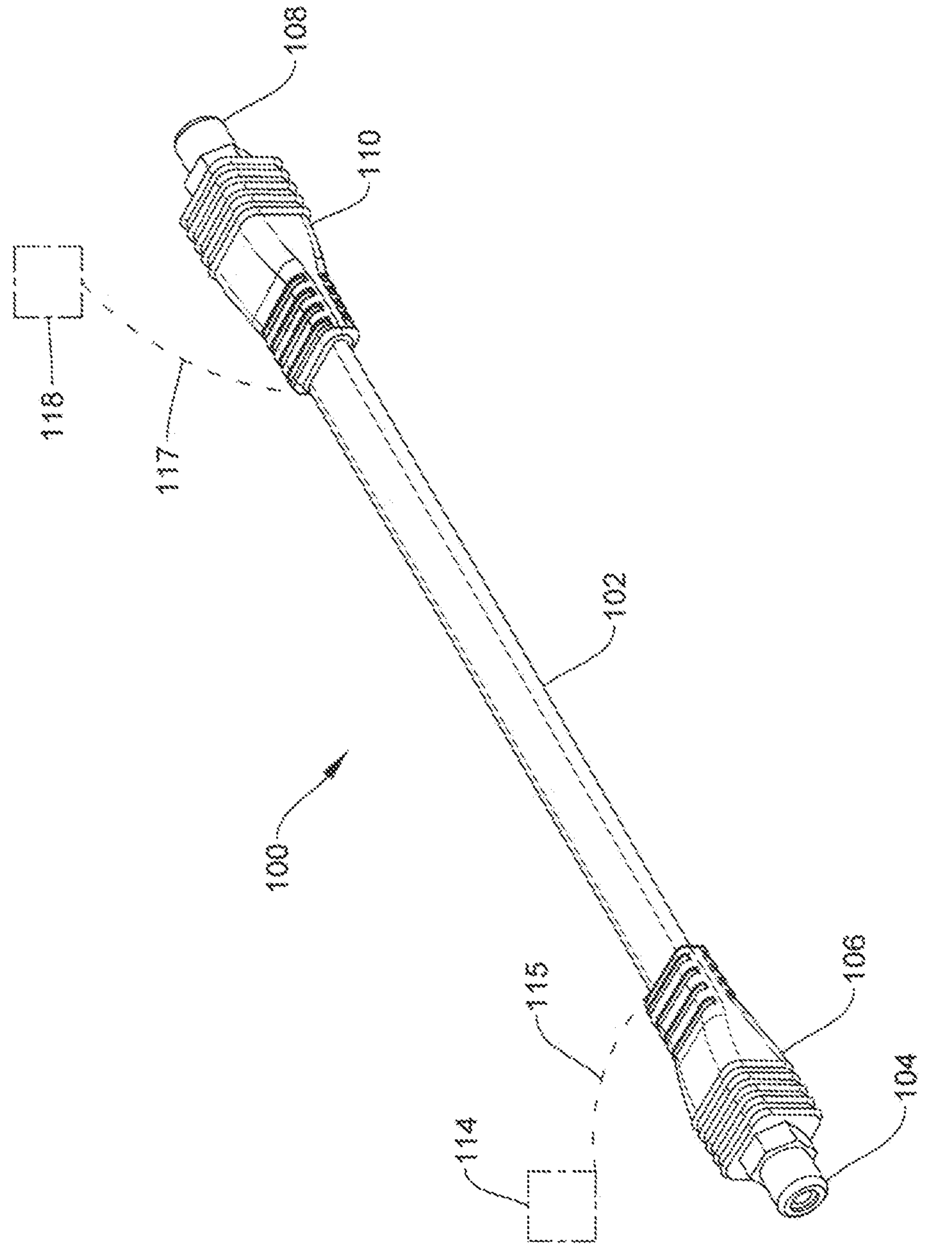
FIG. 1 shows a guarded coaxial cable assembly in accordance with the present invention.

FIG. 1 shows a guarded coaxial cable assembly in accordance with the present invention 100. A substantially flat cableway 102 interconnects with and extends between first and second connectors 104, 108. In some embodiments, over-moldings or boots 106, 110 surround an interface between each connector and the cableway. In some embodiments, auxiliary connectors 114, 118 with respective auxiliary leads 115, 117 are included.

Figure 2:
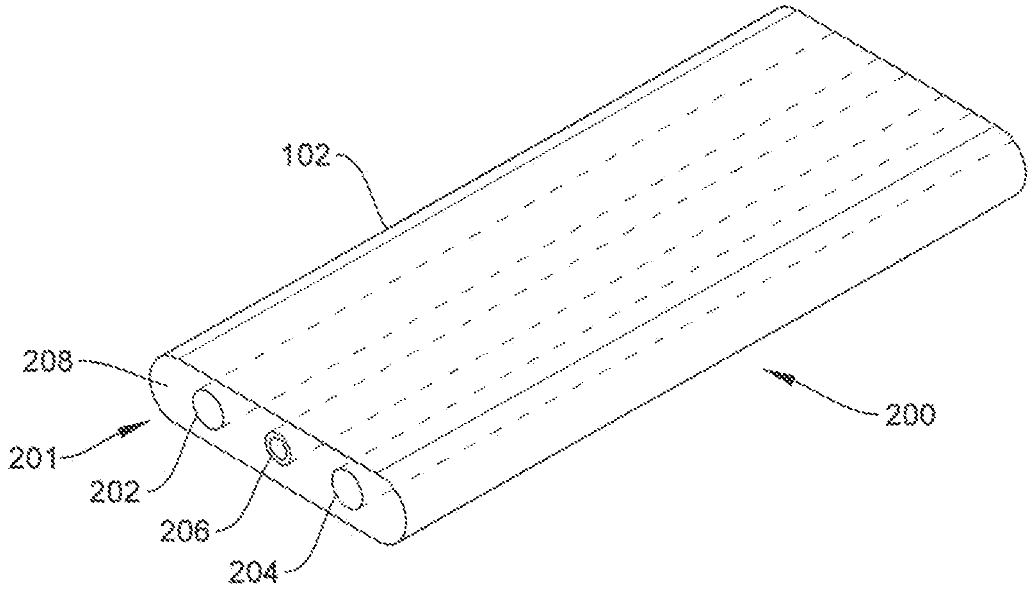
FIG. 2 shows section of the cableway of the guarded coaxial cable assembly of FIG. 1.

FIG. 2 shows a perspective view of a portion of the cableway 200. An exposed end of the cableway 201 reveals a cross-section including a micro-coaxial cable 206, two rails 202, 204 and an outer jacket or matrix 208. In some embodiments a single rail is used. In an embodiment, a centerline of the micro-coaxial cable lies substantially along an imaginary surface defined by a plurality of imaginary lines of shortest distance extending between the rails.

Any suitable coaxial cable connectors 104, 108 known to persons of ordinary skill in the art may be used with the micro-coaxial cable 206. In an embodiment, "F" type coaxial cable connectors are used. In other embodiments, BNC or RCA type connectors are used. In either case, the connectors may be male, female or mixed. In an embodiment, the guarded coaxial cable assembly includes female connectors on each end for interconnection with the male connectors of a larger feeder RF cable.

Figure 3:
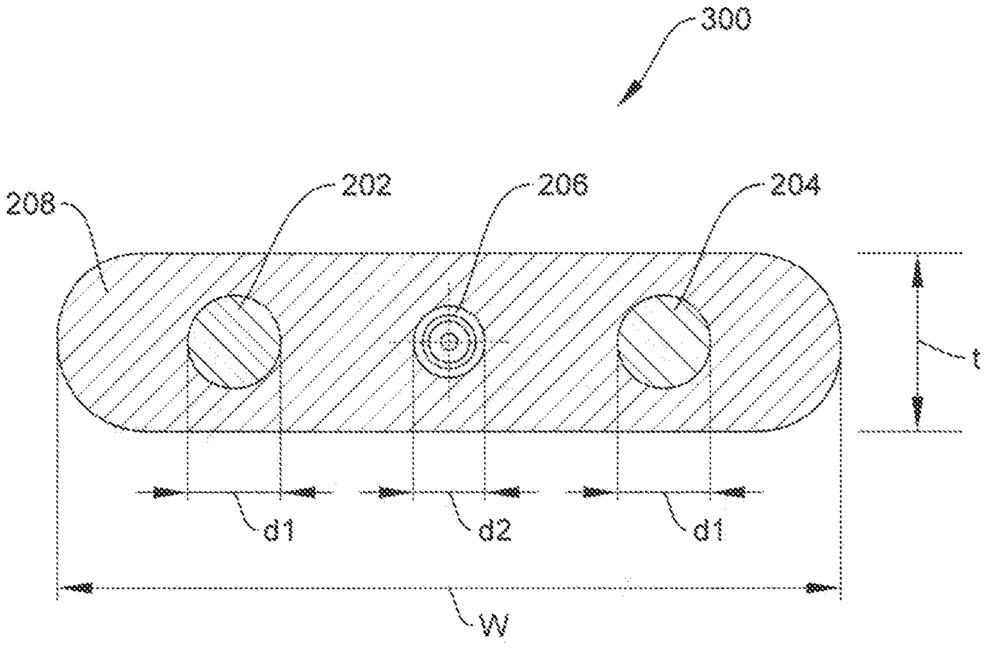
FIG. 3 shows an enlarged cross-section of the cableway of the guarded coaxial cable assembly of FIG. 1.

FIG. 3 shows an enlarged cross-sectional view of the cableway 300. In the embodiment shown, the cable jacket is substantially flat having a thickness "t" suitable for location in narrow passages such as between a door and a door jamb or a window and a window sill. In an embodiment, the cable jacket thickness is in the range of about 2 to 5 mm. And, in an embodiment, the cable jacket thickness is about 3 mm. The cableway width "w" is selected such that the outer jacket envelops the micro-coaxial cables and the rails. In an embodiment, the cable jacket is in the range of about 2×(d1+d1+d2) to 5×(d1+d1+d2) where d1 is the outer diameter of each rail and d2 is the outer diameter of the micro-coaxial cable 206. And, in an embodiment, the cable jacket width is in the range of about 8.4 to 21 mm. In yet another embodiment, the cable jacket width is about 12 mm.

Materials suited for use as cable jackets include flexible, non-conducting and abrasion resistant materials. A number of polymers, including one or more of rubber, silicon, PVC, polyethylene, neoprene, chlorosulphonated polyethylene, and thermoplastic CPE can be used.

Construction methods for integrating the cable jacket 208, rails 202, 204 and micro-coaxial cable 206 include any suitable method known to persons of ordinary skill in the art. In an embodiment, the cable jacket 208 envelops the rails and micro-coaxial cable as it is extruded from a die. In some embodiments (as shown), the jacket envelops the rails and micro-coaxial cable and fills the spaces between them. In yet another embodiment, the assembly is molded such as by filling a mold holding the micro-coaxial cable and rail(s) with a fluid that will solidify and become the cable jacket. Suitable fluids include fluids useful in making the above polymers and other fluids useful for making suitable jacket materials and known to persons of ordinary skill in the art.

Figure 4:
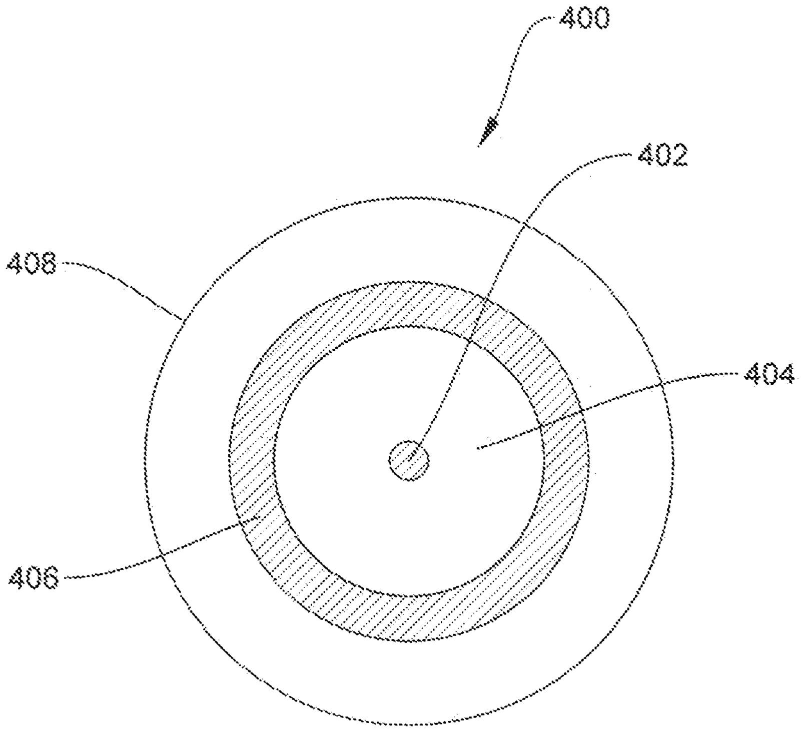
FIG. 4 shows an enlarged cross-section of a coaxial cable of the guarded coaxial cable assembly of FIG. 1.

FIG. 4 shows a cross-sectional view of the micro-coaxial cable 400. A dielectric material 404 separates a central conductor 402 and a conductive ground sheath 406 and the sheath is surrounded by a protective non-conducting outer jacket 408. The selected micro-coaxial cable should be appropriate for the intended service, such as cable TV or feeds from Direct Broadcast Satellite receiving dishes for example.

In an embodiment, the invention includes use of 75 ohm micro-coaxial cable having an outside diameter less than 2 mm which can make a 90 degree bend in a small space and maintain true coaxial performance. The micro cable is protected from radial impact and abrasion by a protective jacket.

Exemplary micro-coaxial cables include MCX™ brand cables sold by Hitachi Cable Manchester. In some embodiments the micro-coaxial cable outer jacket includes a non-stick material such as Teflon® promoting relative motion between the cable and the outer jacket 208.

Whether a single rail or two or more rails are used (two are shown) 202, 204, the rail(s) preferentially bear transverse loads applied to the cableway 102 and tend to prevent harmful compression of the micro-coaxial cable. In various embodiments, the diameter of the micro-coaxial cable d2 is greater than or equal to the diameter of the rails d1. In some of these embodiments the ratio of the diameters d2/d1 is in the range of about 1.0 to 2.0.

In various other embodiments (as shown) the diameter of the micro-coaxial cable d2 is chosen to be somewhat less than the diameter of the rails d1 for added protection. In some of these embodiments the ratio of diameters d1/d2 is in the about 1.0 to 2.0.

Figure 5:
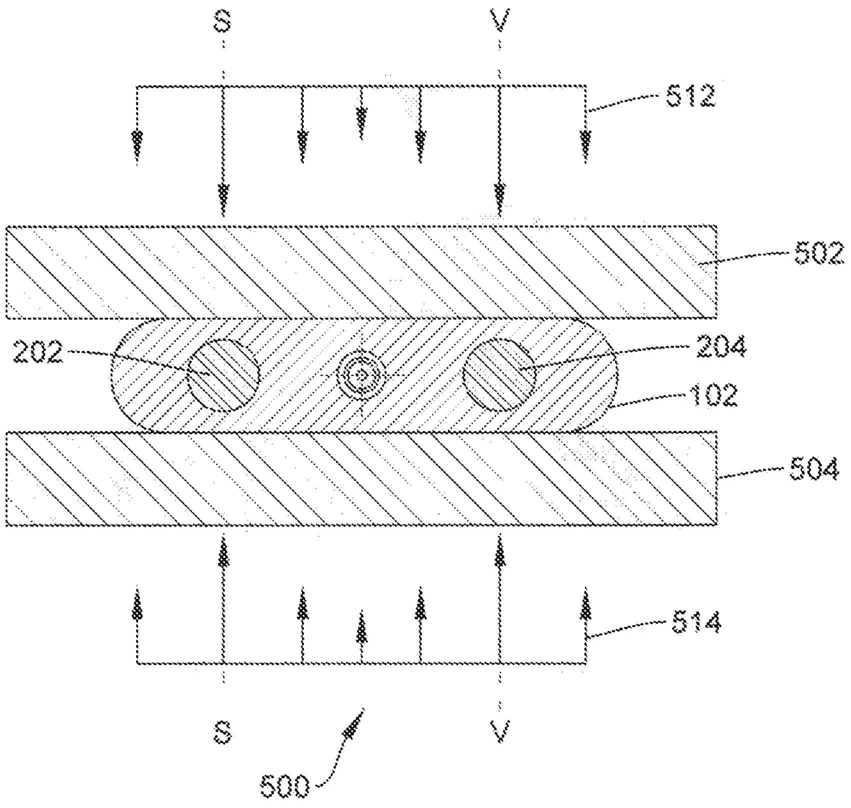
FIG. 5 shows forces applied to an enlarged cross-section of the cableway of the guarded coaxial cable assembly of FIG. 1.

FIG. 5 shows a portion of a cableway subjected to a load 500. In particular, the cableway 102 is squeezed between opposed passage parts 502, 504 tending to compress the cableway. Choosing rail materials that are relatively incompressible as compared to the cableway jacket materials results in most of the load being borne along and near lines s-s and v-v passing through the respective centers of the rails. An example of such a preferential force distribution is shown in opposed force profiles 512, 514.

Materials suited for rail construction are relatively incompressible as compared to cableway jacket materials. In some embodiments, rail construction materials are flexible. And, in some embodiments rail construction materials tend, at least partially, to retain deformed shapes such as an angular profile after being bent around a corner.

In various embodiments, rail construction materials include metals and metal alloys with one or more of iron, steel, copper, aluminum, tin, nickel and other metals known by persons of ordinary skill in the art to have suitable properties. In some embodiments, rail construction materials include non-metals such as polymers. For example, a segmented/articulated rail made from PVC can be used, the segments imparting flexibility and/or a tendency to retain, at least partially, a deformed shape.

In embodiments with conductive rail materials, the rails can serve as conductors. In some such embodiments using two conductive rails, the rails at one end of the guarded coaxial cable are interconnected via a lead 115 with a first electrical connector 114 and the rails at the other end of the guarded coaxial cable are interconnected via a lead 117 with a second electrical connector 118. As persons of ordinary skill in the art will understand, the power handling capability of the rails will be determined by their physical and material properties and the connectors will be chosen to suit the application.

Uses for guarded coaxial cable assemblies include passing through windows, doors and other confined spaces where an unprotected coaxial cable might otherwise be damaged. As discussed above, such protection is desirable for, inter alia, preserving signal quality. And, as discussed above various embodiments orient one or more rails 202, 204 and a micro-coaxial cable in a flat cableway 102 such that transverse loads applied to the cableway are preferentially borne by the rail(s).

Figure 6:
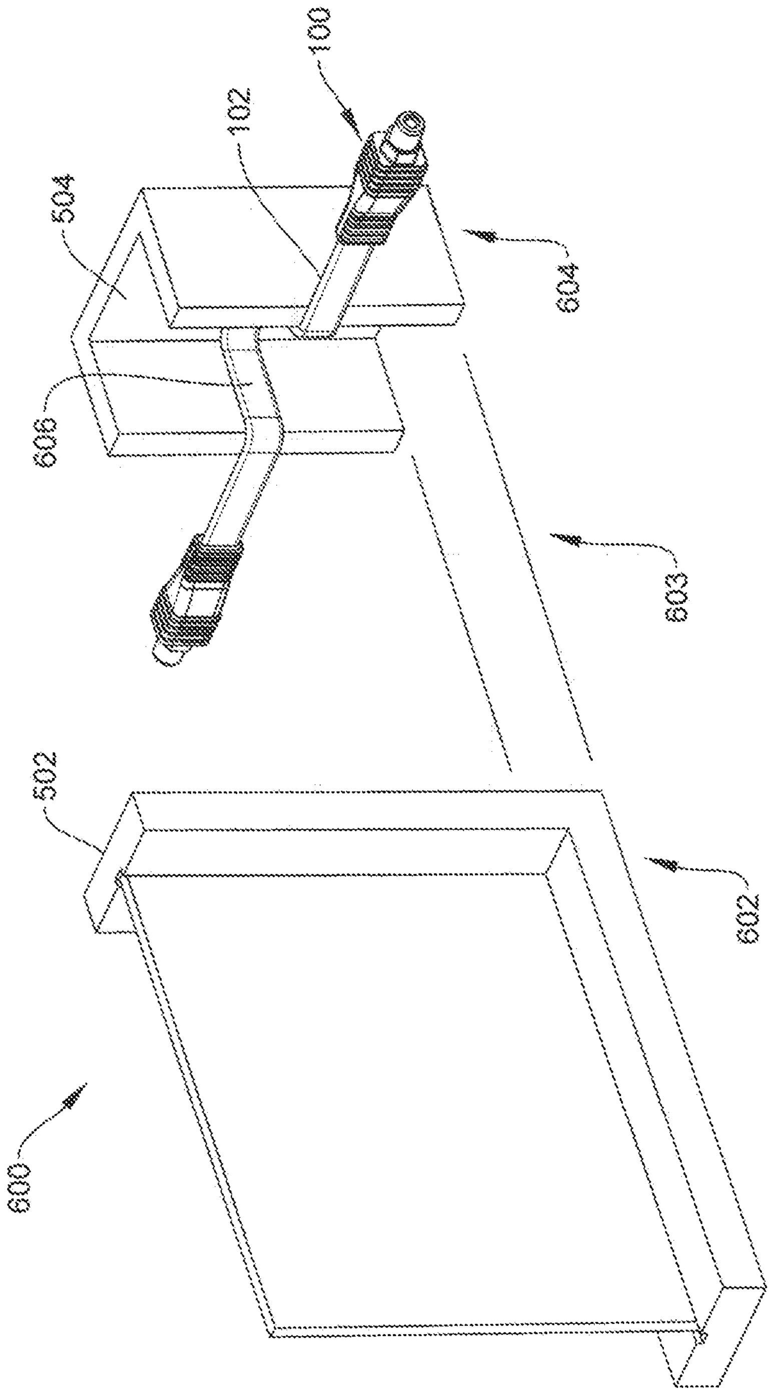
FIG. 6 shows the guarded coaxial cable assembly of FIG. 1 installed in a window or door frame.

FIG. 6 shows a guarded coaxial cable assembly installed in an open sliding window or door jamb 600. Here, the cable assembly passes between the opposed passage parts 502, 504 located on a respective sliding sash 602 and a fixed jamb 604. When the sash slides along a slide part 603, it presses a cableway section of the cable assembly 606 into a shape matching the "U" shaped profile of the confined space.

Figure 7:
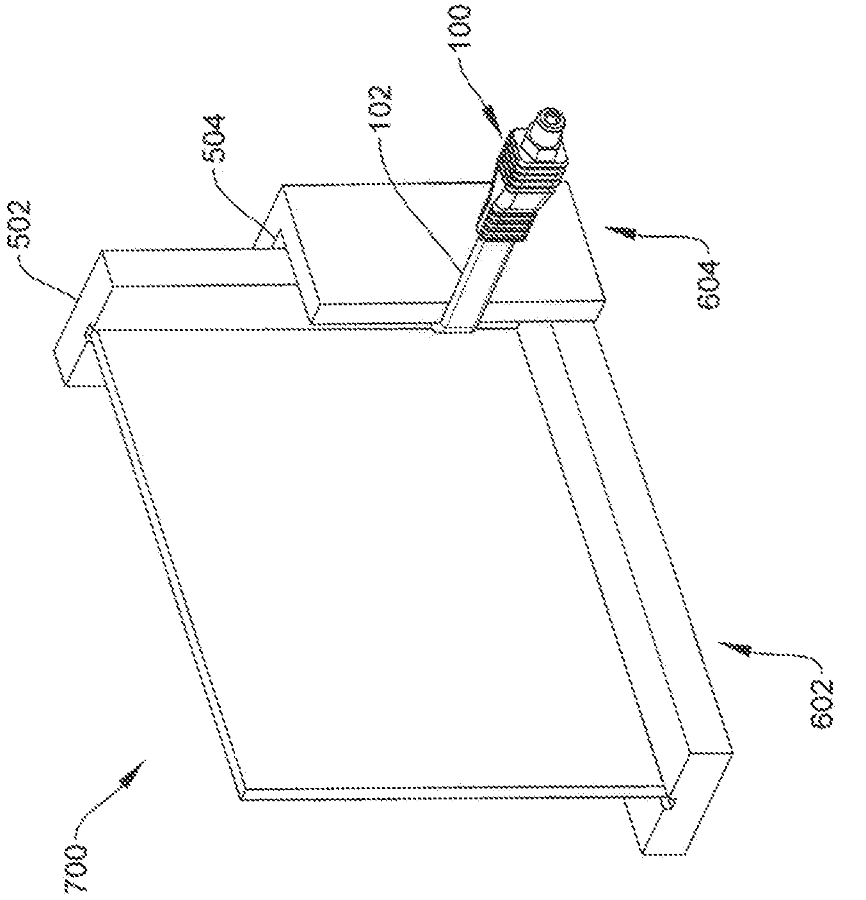
FIG. 7 shows the guarded coaxial cable assembly of FIG. 1 being squeezed by a closed window or door.

FIG. 7 shows a guarded coaxial cable assembly installed in a closed sliding window or door jamb 700. As described above in connection with FIG. 5, the rails 202, 204 of the cableway 102 guard the micro-coaxial cable 206 against compression and crushing due to closing the sash or door 602 and squeezing the cableway between the passage parts 502, 504.

In addition to a micro coaxial cable, an unshielded pair or twisted pair may be used. For example any of CAT5, CAT5e, CAT6, CAT7, and CAT7a may be used.

Figure 8A:
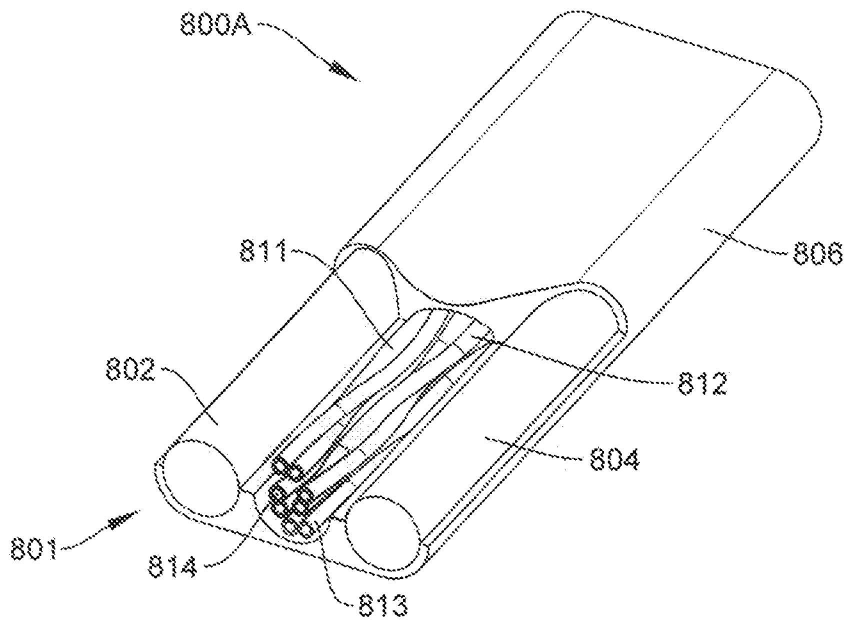
FIGS. 8A-B show a guarded cable assembly of a first type.
Figure 8B:
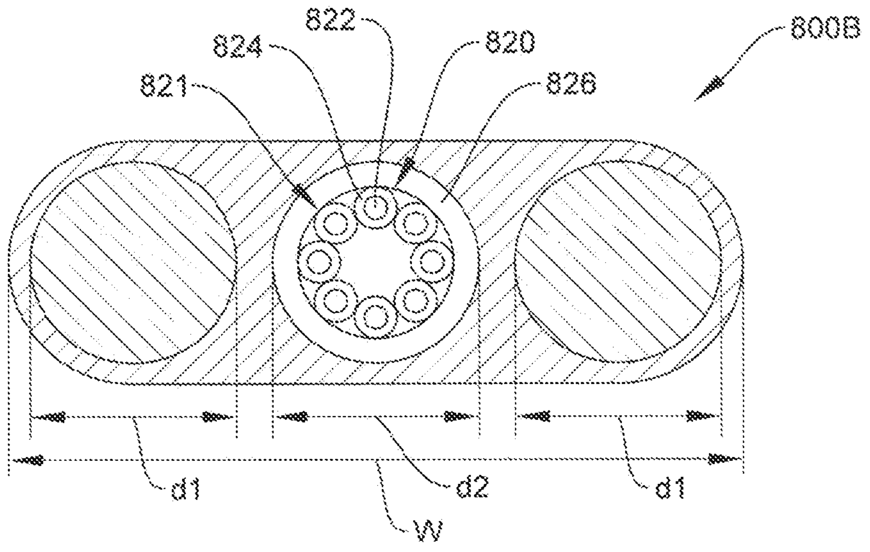

FIGS. 8A-B show perspective and end views of a cableway 800A-B. An exposed end of the cableway 801 reveals a cross-section including one or more twisted pair 811, 812, 813, 814 flanked by one or two rails 802, 804 and an outer jacket or matrix 806. In an embodiment, a centerline of the twisted pairs lies substantially along an imaginary surface defined by a plurality of imaginary lines of shortest distance extending between the rails.

Any suitable twisted pair connectors known to persons of ordinary skill in the art may be used with the cableway 800A-B. In an embodiment, "RJ45" type connectors or CAT 5 compatible connectors are used. In other embodiments, BNC or RCA type connectors are used. In either case, the connectors may be male, female or mixed. In an embodiment, the guarded cable assembly includes female connectors on each end for interconnection with the male connectors. In an embodiment, the guarded cable assembly includes male connectors on each end for interconnection with female connectors.

FIG. 8B shows an enlarged cross-sectional view of the cableway 800B. In the embodiment shown, the cable jacket is substantially flat having a thickness "t" suitable for location in narrow passages such as between a door and a door jamb or a window and a window sill. In an embodiment, the cable jacket thickness is in the range of about 4 to 8 mm. And, in an embodiment, the cable jacket thickness is about 6 mm. The cableway width "w" is selected such that the outer jacket envelops the twisted pair cables and the rails. In an embodiment, the cable jacket is in the range of about $0.5\times(d1+d1+d2)$ to $2\times(d1+d1+d2)$ where d1 is the outer diameter of each rail and d2 is the outer diameter of the twisted pair or bundle of twisted pair cables 811-814. And, in an embodiment, the cable jacket width is in the range of about 8 to 24 mm. In yet another embodiment, the cable jacket width is about 18 mm.

Materials suited for use as cable jackets include flexible, non-conducting and abrasion resistant materials. A number of polymers, including one or more of rubber, silicon, PVC, polyethylene, neoprene, chlorosulphonated polyethylene, and thermoplastic CPE can be used.

Construction methods for integrating the cable jacket 806, rails 802, 804 and twisted pair(s) 811-814 include any suitable method known to persons of ordinary skill in the art. In an embodiment, the cable jacket 806 envelops the rails and twisted pairs as it is extruded from a die. In some embodiments (as shown), the jacket envelopes the rails and twisted pairs and fills the spaces between them. In yet another embodiment, the assembly is molded such as by filling a mold holding the twisted pairs and rail(s) with a fluid that will solidify and become the cable jacket. Suitable fluids include fluids useful in making the above the above polymers and other fluids useful for making suitable jacket materials and known to persons of ordinary skill in the art.

In an embodiment, the twisted pair incudes two conductors that are insulated and twisted. FIG. 8B shows this construction. In the figure, a typical wire of the twisted pair 820-821 includes a solid conductor 822 in an insulating jacket 824. The wire is twisted with an adjacent wire to form a twisted pair. In some embodiments one or more twisted pair are encased in a jacket 826.

In an embodiment, the twisted pair cables relying on the balanced line twisted pair design and differential signaling for noise rejection and cable performance or bandwidth is 100 MHz or higher.

In an embodiment, the invention includes use of a twisted pair having an outside diameter of less than 3 mm. In an embodiment the cable can make a 90 degree bend in a small space. In various embodiments, the cable can maintain true twisted pair performance, for example CAT 5 performance.

In an embodiment, the invention includes use of four twisted pair having an outside diameter of less than 7 mm. In an embodiment the cable can make a 90 degree bend in a small space. In various embodiments, the cable can maintain true twisted pair performance, for example CAT 5 performance.

In some embodiments a cable or conductor outer jacket includes a non-stick material such as Teflon® promoting relative motion between the cable or conductor and the outer jacket 208.

Whether a single rail or two or more rails are used (two are shown) 802, 804, the rail(s) preferentially bear transverse loads applied to the cableway and tend to prevent harmful compression of the twisted pair(s). In some embodiments, the diameter of the twisted pair cable d2 is less than or equal to the diameter of the rails. In some of these embodiments the ratio of the diameters d1/d2 is in the range of about 1.0 to 2.0.

Figure 9A:
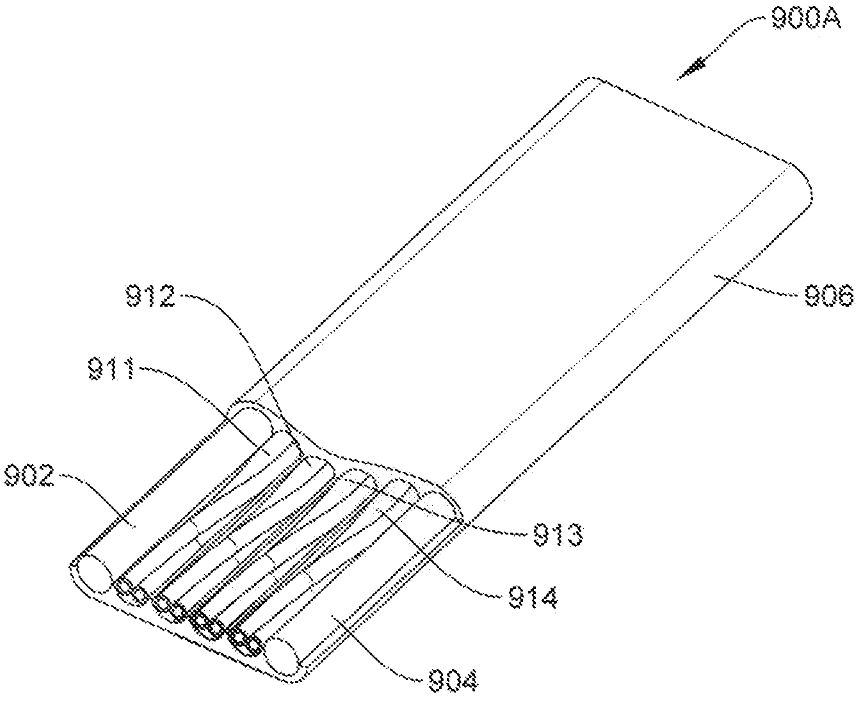
FIGS. 9A-B show a guarded cable assembly of a second type.
Figure 9B:
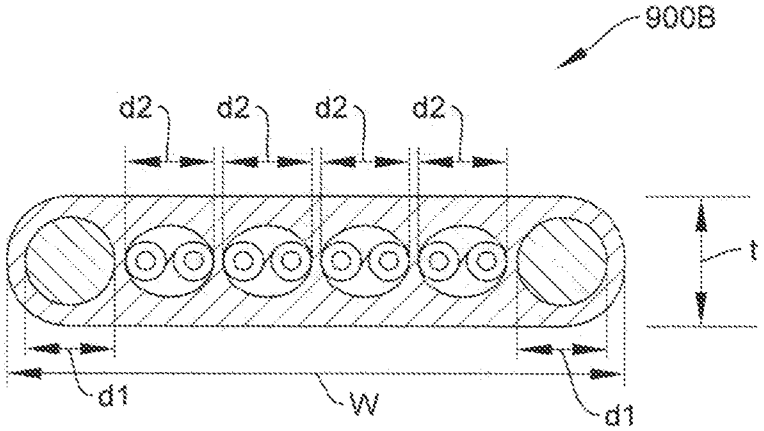

FIGS. 9A-B show perspective and end views of a cableway 900A-B. An exposed end of the cableway 901 reveals a cross-section including one or more twisted pair 911, 912, 913, 914 flanked by one or two rails 902, 904 and an outer jacket or matrix 906. In an embodiment, centerlines of the twisted pairs lies substantially along an imaginary surface defined by a plurality of imaginary lines of shortest distance extending between the rails.

Any suitable twisted pair connectors known to persons of ordinary skill in the art may be used with the cableway 900A-B. In an embodiment, "RJ45" type connectors or CAT 5 compatible connectors are used. In other embodiments, BNC or RCA type connectors are used. In either case, the connectors may be male, female or mixed. In an embodiment, the guarded cable assembly includes female connectors on each end for interconnection with the male connectors. In an embodiment, the guarded cable assembly includes male connectors on each end for interconnection with female connectors.

FIG. 9B shows an enlarged cross-sectional view of the cableway 900B. In the embodiment shown, the cable jacket is substantially flat having a thickness "t" suitable for location in narrow passages such as between a door and a door jamb or a window and a window sill. In an embodiment, the cable jacket thickness is in the range of about 2 to 6 mm. And, in an embodiment, the cable jacket thickness is about 3 mm. The cableway width "w" is selected such that the outer jacket envelops the twisted pair cables and the rails. In an embodiment, the cable jacket is in the range of about (0.8×(d1+d1±4d2)) to (5×(d1+d1+4d2)) where d1 is the outer diameter of each rail and d2 is the outer diameter of each twisted pair 911-914. And, in an embodiment, the cable jacket width is in the range of about 11 to 21 mm. In yet another embodiment, the cable jacket width is about 16 mm.

Materials suited for use as cable jackets include flexible, non-conducting and abrasion resistant materials. A number of polymers, including one or more of rubber, silicon, PVC, polyethylene, neoprene, chlorosulphonated polyethylene, and thermoplastic CPE can be used.

Construction methods for integrating the cable jacket 906, rails 902, 904 and twisted pair(s) 911-914 include any suitable method known to persons of ordinary skill in the art. In an embodiment, the cable jacket 906 envelops the rails and twisted pairs as it is extruded from a die. In some embodiments (as shown), the jacket envelopes the rails and twisted pairs and fills the spaces between them. In yet another embodiment, the assembly is molded such as by filling a mold holding the twisted pairs and rail(s) with a fluid that will solidify and become the cable jacket. Suitable fluids include fluids useful in making the above the above polymers and other fluids useful for making suitable jacket materials and known to persons of ordinary skill in the art.

In an embodiment, the twisted pair incudes two conductors that are insulated and twisted. See the discussion of FIG. 8B for details.

In an embodiment, the invention includes use of a twisted pair having an outside diameter of less than 3 mm. In an embodiment the cable can make a 90 degree bend in a small space. In various embodiments, the cable can maintain true twisted pair performance, for example CAT 5 performance.

In some embodiments the cable or conductor outer jacket includes a non-stick material such as Teflon® promoting relative motion between the cable or conductor and the outer jacket 208.

Whether a single rail or two or more rails are used (two are shown) 802, 804, the rail(s) preferentially bear transverse loads applied to the cableway and tend to prevent harmful compression of the twisted pair(s). In some embodiments, the diameter of the twisted pair cable d2 is less than or equal to the diameter of the rails. In some of these embodiments the ratio of the diameters d1/d2 is in the range of about 1.0 to 2.0.

Figure 10A:
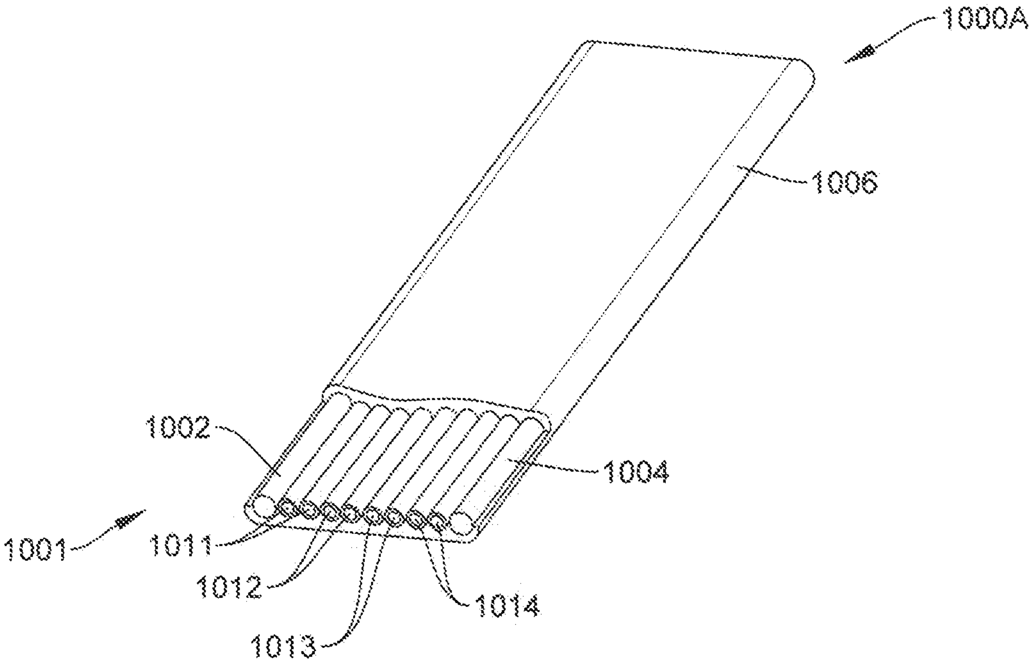
FIGS. 10A-B show a guarded cable assembly of a third type.
Figure 10B:
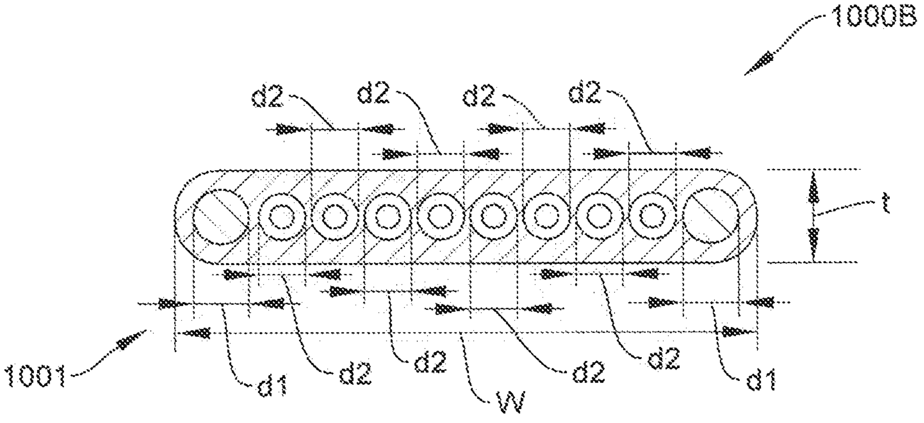

FIGS. 10A-B show perspective and end views of a cableway 1000A-B. An exposed end of the cableway 1001 reveals a cross-section including one or more pair 1011, 1012, 1013, 1014 flanked by one or two rails 1002, 1004 and an outer jacket or matrix 1006. The pairs are not twisted. In an embodiment, centerlines of the pairs lie substantially along an imaginary surface defined by a plurality of imaginary lines of shortest distance extending between the rails.

Any suitable connectors known to persons of ordinary skill in the art may be used with the cableway 1000A-B. In an embodiment, "RJ45" type connectors are used or CAT 5 compatible connectors are used. In other embodiments, BNC or RCA type connectors are used. In either case, the connectors may be male, female or mixed. In an embodiment, the guarded cable assembly includes female connectors on each end for interconnection with the male connectors. In an embodiment, the guarded cable assembly includes male connectors on each end for interconnection with female connectors.

FIG. 10B shows an enlarged cross-sectional view of the cableway 1000B. In the embodiment shown, the cable jacket is substantially flat having a thickness "t" suitable for location in narrow passages such as between a door and a door jamb or a window and a window sill. In an embodiment, the cable jacket thickness is in the range of about 1.5 to 3 mm. And, in an embodiment, the cable jacket thickness is about 2.2 mm. The cableway width "w" is selected such that the outer jacket envelops the twisted pair cables and the rails. In an embodiment, the cable jacket is in the range of about (1.0×(d1+d1+8d2)) to (1.8×(d1+d1+8d2)) where d1 is the outer diameter of each rail and d2 is the outer diameter of each the wires in the pairs 1011-1014. And, in an embodiment, the cable jacket width is in the range of about 10 to 19 mm. In yet another embodiment, the cable jacket width is about 14 mm.

Materials suited for use as cable jackets include flexible, non-conducting and abrasion resistant materials. A number of polymers, including one or more of rubber, silicon, PVC, polyethylene, neoprene, chlorosulphonated polyethylene, and thermoplastic CPE can be used.

Construction methods for integrating the cable jacket 1006, rails 1002, 1004 and conductors 1011-1014 include any suitable method known to persons of ordinary skill in the art. In an embodiment, the cable jacket 1006 envelops the rails and conductors as it is extruded from a die. In some embodiments (as shown), the jacket envelopes the rails and conductors and fills the spaces between them. In yet another embodiment, the assembly is molded such as by filling a mold holding the conductors and rail(s) with a fluid that will solidify and become the cable jacket. Suitable fluids include fluids useful in making the above the above polymers and other fluids useful for making suitable jacket materials and known to persons of ordinary skill in the art.

In an embodiment, the invention includes uses pair wires having an outside diameter of less than 1.5 mm. In an embodiment the cable can make a 90 degree bend in a small space. In various embodiments, the cable can maintain true twisted pair performance, for example CAT 5 performance. In various embodiments, the cable can maintain true twisted pair performance, for example CAT 5 performance minimums. In an embodiment, the cable bandwidth is greater than 50 MHz.

In some embodiments the micro-coaxial cable outer jacket includes a non-stick material such as Teflon® promoting relative motion between the cable and the outer jacket 208.

Whether a single rail or two or more rails are used (two are shown) 1002, 1004, the rail(s) preferentially bear transverse loads applied to the cableway and tend to prevent harmful compression of the twisted pair(s). In some embodiments, the diameter of the pair wires d2 is less than or equal to the diameter of the rails. In some of these embodiments the ratio of the diameters d1/d2 is in the range of about 1.0 to 2.0.

Figure 11A:
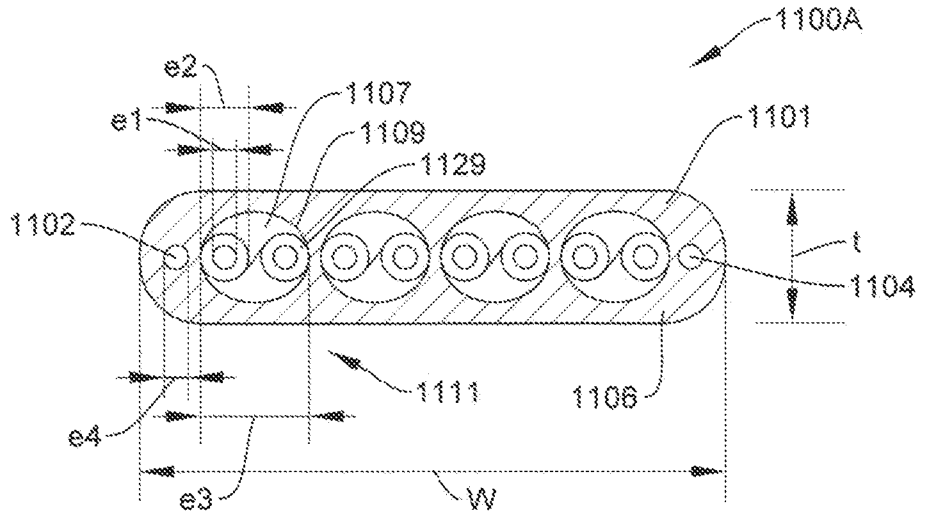
FIGS. 11A-B show a guarded cable assembly of a fourth type.
Figure 11B:
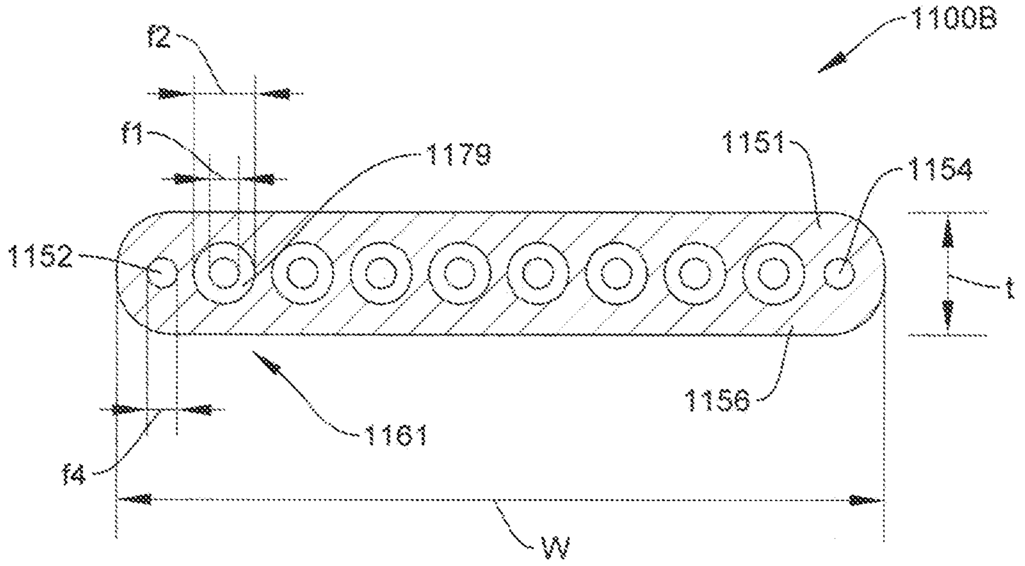

FIGS. 11A-B show end views of cableways 1100A-B similar to those found in FIGS. 9B and 10B.

FIG. 11A shows an end views of a cableway 1100A. An exposed end of the cableway 1101 reveals a cross-section including one or more twisted pair 1111 (4X twisted pair in this embodiment) flanked by one or two rails 1102, 1104 and an outer jacket or matrix 1106. In an embodiment, centerlines of the twisted pairs lies substantially along an imaginary surface defined by a plurality of imaginary lines of shortest distance extending between the rails.

In various embodiments the twisted pair is jacketed 1109 and/or in a matrix 1107 similar to the matrix above 1106. And in various embodiments the conductors "e1" of the twisted pair are jacketed 1129.

Any suitable twisted pair connectors known to persons of ordinary skill in the art may be used with this cableway 1100A. In an embodiment, "RJ45" type connectors or CAT 5 compatible connectors are used. In other embodiments, BNC or RCA type connectors are used. In either case, the connectors may be male, female or mixed. In an embodiment, the guarded cable assembly includes female connectors on each end for interconnection with the male connectors. In an embodiment, the guarded cable assembly includes male connectors on each end for interconnection with female connectors.

As shown, the cable jacket is substantially flat having a thickness "t" suitable for location in narrow passages such as between a door and a door jamb or a window and a window sill. Cableway dimensions are selected according to the application. Dimensions for specific embodiments include those found in the table below.

| | Embodiments | |
|---|---|---|
| Variable | First | Second |
| t | 2-6 mm; 3 mm; | 2-6 mm; 3 mm; |
| w | 9-16 mm; 13 mm; | (0.9 × (e4 + e4 + 4e3)) to (1.7 × (e4 + e4 + 4e3)) |
| e1 | 0.4-1.0 mm; 0.5 mm; | 0.4-1.0 mm; 0.5 mm |
| e2 | 0.8-1.5 mm; 1.0 mm; | 0.8-1.5 mm; 1.0 mm; |
| e3 | 1.75-3.0 mm; 2.3 mm | 1.75-3.0 mm; 2.3 mm |
| e4 | 0.4-0.75 mm; 0.5 mm; | 0.4-0.75 mm; 0.5 mm; |

Materials suited for use as cable jackets include flexible, non-conducting and abrasion resistant materials. A number of polymers, including one or more of rubber, silicon, PVC, polyethylene, neoprene, chlorosulphonated polyethylene, and thermoplastic CPE can be used.

Construction methods for integrating the cable jacket 1106, rails 1102, 1104 and twisted pair(s) 1111 include any suitable method known to persons of ordinary skill in the art. In an embodiment, the cable jacket 1106 envelops the rails and twisted pairs as it is extruded from a die. In some embodiments (as shown), the jacket envelopes the rails and twisted pairs and fills the spaces between them. In yet another embodiment, the assembly is molded such as by filling a mold holding the twisted pairs and rail(s) with a fluid that will solidify and become the cable jacket. Suitable fluids include fluids useful in making the above the above polymers and other fluids useful for making suitable jacket materials and known to persons of ordinary skill in the art.

In an embodiment, the twisted pair incudes two conductors that are insulated 1129 and twisted. See the discussion of FIG. 8B for details.

In an embodiment, the invention includes use of a twisted pair having an outside diameter of less than 3 mm and in an embodiment the cable can make a 90 degree bend in a small space, for example wrapping around doors and window frames while allowing the door or window to be closed. In various embodiments, the cable can maintain true twisted pair performance, for example CAT 5 performance.

In some embodiments the outer jacket 1109 includes a non-stick material such as Teflon® promoting relative motion between the cable and the outer jacket 1106.

Whether a single rail or two or more rails are used (two are shown) 1102, 1104, the rail(s) bear or preferentially bear transverse loads applied to the cableway and tend to prevent harmful compression of the twisted pair(s) and/or of the conductors of the twisted pairs.

In some embodiments, the diameter of the twisted pair cable e3 is less than or equal to the diameter of the rails and in some embodiments the diameter of the rails is less than the diameter of the twisted pair, an insulated conductor of the twisted pair, or a conductor of the twisted pair. In some of these embodiments the ratio of the diameters e4/e3 is in the range of about 1.0 to 2.0. And in some embodiments the ration of the diameters e3/e4 is in the range of about 1.0 to 2.0.

Applicant notes that conductors may be arranged in substantially parallel arrangement with respect to the rail or rails. Substantially in this context means that variation owing to the twisting of the conductors required to form the twisted cable continues to be considered a parallel arrangement.

FIG. 11B shows an end views of a cableway 1100B. An exposed end of the cableway 1151 reveals a cross-section including one or more pair (4 pair shown) 1161 flanked by one or two rails 1152, 1154 and an outer jacket or matrix 1156. The pairs are not twisted. In an embodiment, centerlines of the pairs lie substantially along an imaginary surface defined by a plurality of imaginary lines of shortest distance extending between the rails.

Any suitable connectors known to persons of ordinary skill in the art may be used with the cableway 1100B. In an embodiment, "RJ45" type connectors are used or CAT 5 compatible connectors are used. In other embodiments, BNC or RCA type connectors are used. In either case, the connectors may be male, female or mixed. In an embodiment, the guarded cable assembly includes female connectors on each end for interconnection with the male connectors. In an embodiment, the guarded cable assembly includes male connectors on each end for interconnection with female connectors.

In the embodiment shown, the cable jacket is substantially flat having a thickness "t" suitable for location in narrow passages such as between a door and a door jamb or a window and a window sill. Dimensions for specific embodiments include those found in the table below.

| | Embodiments | |
|---|---|---|
| Variable | First | Second |
| t | 1.2-2.5 mm; 2 mm | 1.2-2.5; 2.0 mm; |
| w | 9-16 mm; 23 mm | (1.0 × (e4 + e4 + 4e3)) to (1.9 × (e4 + e4 + 4e3)) |
| f1 | 0.4-1.0 mm; 0.5 mm | 0.4-1.0 mm; 0.5 mm |
| f2 | 0.8-1.5 mm; 1.0 mm | 1.5-2.5 mm; 2.0 mm |
| f4 | 0.4-0.75 mm; 0.5 mm | 0.4-0.75; 0.5 mm |

Materials suited for use as cable jackets include flexible, non-conducting and abrasion resistant materials. A number of polymers, including one or more of rubber, silicon, PVC, polyethylene, neoprene, chlorosulphonated polyethylene, and thermoplastic CPE can be used.

Construction methods for integrating the cable jacket 1156, rails 1152, 1154 and pair(s) 1011 include any suitable method known to persons of ordinary skill in the art. In an embodiment, the cable jacket 1156 envelops the rails and twisted pairs as it is extruded from a die. In some embodiments (as shown), the jacket envelopes the rails and twisted pairs and fills the spaces between them. In yet another embodiment, the assembly is molded such as by filling a mold holding the twisted pairs and rail(s) with a fluid that will solidify and become the cable jacket. Suitable fluids include fluids useful in making the above the above polymers and other fluids useful for making suitable jacket materials and known to persons of ordinary skill in the art.

In an embodiment, the invention includes uses pair wires having an outside diameter of less than 1.5 mm. In an embodiment the cable can make a 90 degree bend in a small space such as around a door or around a window frame. In various embodiments, the cable can maintain true twisted pair performance, for example CAT 5 performance. In an embodiment, the cable bandwidth is greater than 50 MHz.

In an embodiment the cable 1161 may include a jacket or insulating layer 1179. In these embodiments the cable outer jacket 1179 may include a non-stick material such as Teflon® promoting relative motion between the cable and the outer jacket 1156.

Whether a single rail or two or more rails are used (two are shown) 1152, 1154, the rail(s) bear or preferentially bear transverse loads applied to the cableway and tend to prevent harmful compression of the cables 1161. In some embodiments, the diameter of the pair wires f2 is less than or equal to the diameter of the rails 1502, 1504 and in some embodiments the diameter of the rails is less than the diameter of the pair wires. In some of these embodiments the ratio of the diameters f4/f2 or f4/f1 is in the range of about 1.0 to 2.0. In some embodiments the ration of the diameters f2/f4 or f1/f4 is in the range of about 1.0 to 2.0.

While various embodiments of the present invention have been described above, it should be understood that they have been presented by way of example only, and not limitation. It will be apparent to skilled artisans that various changes in form and details can be made without departing from the spirit and scope of the invention. As such, the breadth and scope of the present invention should not be limited by the above-described examples, but should be defined only in accordance with the following claims and equivalents thereof.

What is claimed is:

1. An assembly for guarding an electrical cable comprising:

the electrical cable including an electrical conductor within an insulating sheath;

a first metallic rail extending alongside the electrical cable;

an outer jacket that envelops the first metallic rail and the electrical cable;

the jacket having a generally rectangular cross-section with two opposed wide sides and two opposed narrow sides;

the opposed wide sides form opposed wide bearing surfaces for bearing transverse loads;

an orientation of the first metallic rail and the electrical cable within the jacket configured to limit deformation of the electrical cable resulting from one or more transverse loads applied to the opposed wide bearing surfaces; and, the assembly undergoes bends of 90-degree or more as the assembly is squeezed between a sash and a mating U shaped jamb such that the opposed wide bearing surfaces are subjected to the transverse loads.

2. The assembly of claim 1 wherein the conductor is centrally located in the electrical cable.

3. The assembly of claim 2 further comprising a first metallic rail diameter equal to or less than a sheath diameter.

4. The assembly of claim 2 further comprising a first metallic rail diameter greater than a sheath diameter.

5. The assembly of claim 2 wherein the insulating sheath is surrounded by an electrical shield.

6. The assembly of claim 1 wherein the two opposed wide bearing surfaces include at least in part opposed planes.

7. The assembly of claim 1 wherein the two opposed wide bearing surfaces are described at least in part by parallel planes.

8. The assembly of claim 7 wherein the parallel planes are about 3 mm apart.

9. The assembly of claim 1 wherein the electrical conductor is one of a twisted pair of conductors.

10. The assembly of claim 9 further comprising a total of two or more twisted pairs of conductors between the first metallic rail and a second rail.

11. The assembly of claim 10 for interconnection with RJ45 or CAT 5 connectors.

12. An assembly for guarding an electrical cable comprising:

rails of metal, the electrical cable arranged between the rails;

the electrical cable including an electrical cable conductor within an insulating sheath;

the rails and electrical cable within an outer insulating jacket having a generally rectangular cross-section with a wide dimension and a narrow dimension; and, an orientation of the rails and electrical cable within the jacket configured to protect the electrical cable from opposing forces that bear on wide dimension bearing surfaces and that pass through the narrow dimension;

wherein the assembly is capable of 90-degree bends as when squeezed between a window jamb mated with a window sash.

13. The assembly of claim 12 wherein the bends are facilitated by an outer jacket narrow dimension of about 2 mm to 6 mm.

14. The assembly of claim 12 wherein the bends are facilitated by an outer jacket narrow dimension of about 3 mm.

15. The assembly of claim 12 wherein the bends are facilitated by an outer jacket wide dimension of about 11 mm to 21 mm.

16. The assembly of claim 12 wherein the bonds are facilitated by an outer jacket wide dimension of about 16 mm.

17. The assembly of claim 12 wherein the rails transport electrical power or electrical signals.

18. The assembly of claim 12 wherein the electrical cable conductor is centrally located within the electrical cable.

19. The assembly of claim 18 wherein the insulating sheath is surrounded by an electrical shield.

20. The assembly of claim 12 wherein the electrical cable is for interconnection with one or more coaxial connectors.

* * * * *